United States Patent [19]
Ho

[11] Patent Number: 5,329,399
[45] Date of Patent: Jul. 12, 1994

[54] ONE-PIECE FΘ-DEC SCANNING LENS

[75] Inventor: Leit Ho, Taipei, Taiwan

[73] Assignee: Industrial Technology Research Institute, Hsinchu, Taiwan

[21] Appl. No.: 71,312

[22] Filed: Jun. 2, 1993

[30] Foreign Application Priority Data

Mar. 12, 1993 [CN] China .................................. 82101878

[51] Int. Cl.$^5$ ............................................. G02B 26/08
[52] U.S. Cl. ........................................ 359/662; 359/206
[58] Field of Search .................................. 359/206, 662

[56] References Cited

U.S. PATENT DOCUMENTS

| | | | |
|---|---|---|---|
| 3,750,189 | 7/1973 | Fleischer | 159/710 |
| 4,571,035 | 2/1986 | Sakuma | 359/662 |
| 5,196,957 | 3/1993 | Brueggemann | 359/662 |
| 5,277,383 | 9/1993 | Brueggemann | 359/662 |

*Primary Examiner*—Scott J. Sugarman
*Attorney, Agent, or Firm*—Ladas & Parry

[57] ABSTRACT

Both of the first surface and the second surface of the one-piece fΘ-DEC scanning lens of the present invention have to be in accordance with the following equation:

$$Z = (C_x X^2 + C_y Y^2)/\{1 + SQRT[1 - (1 + K_x) C_x^2 X^2 - (1 + K_y) C_y^2 Y^2]\} + \Sigma A_n [(1 - A_n') X^2 + (1 + A_n') Y^2]$$

and the following criterion has to be satisfied:
(1) $0.27 \leq f_x/f_y \leq 0.35$
(2) $|R_{1y}| > |R_{2y}|$
(3) $0.3 < R_{2x}/R_{2y} < 0.6$, $R_{1x}/R_{1y} \leq 0$ Therefore, the one-piece fΘ-DEC scanning lens of the present invention is capable of replacing a convention two-element fΘ lens group so as to compensate the Wobble effect, scan linearly, and greatly decrease the setup volume of the scanner at the same time.

3 Claims, 16 Drawing Sheets

ONE-PIECE FΘ-DEC SCANNING LENS

BACKGROUND OF THE INVENTION

The present invention relates to a one-piece fΘ-DEC scanning lens, particularly to a fΘ-DEC scanning lens comprising a one piece lens instead of a conventional two piece lens, which is capable of compensating the Wobble effect, scanning linearly, and decreasing setup volume at the same time.

Referring to FIG. 1a, FIG. 1a is a schematic diagram which shows a conventional two-element fΘ lens group used in laser printer. In FIG. 1a, a parallel light beam, emitted by a light source and a collimating lens 10, passes through a cylindrical lense 20 having curvature in the direction of the secondary scanning plane (the secondary scanning plane is defined as the plane perpendicular to the scanning plane), so that the light beam is focused on the polygon mirror scanner 30. When the polygon mirror scanner 30 rotates, the light beam is reflected by the polygon mirror 30 so as to form a scanning light beam at the scanning plane. Furthermore, the scanning light beam passes through a two-element fΘ lens group 40 which is composed of a meniscus lens 42 and a cylindrical lens 44 so that the scanning light beam is capable of being projected on an imaging surface (for example, a light-sensing drum 50), while the two-element fΘ lens 40 has to have the following effects:

(1) causing the light beam to be focused onto a straight line on the imaging surface;

(2) because the polygon mirror scanner rotates at a uniform angular velocity, the two-element fΘ lens has to convert the incident light beam rotating the same as the polygon mirror scanner into the light beam moving linearly on the imaging surface;

(3) as shown in FIG. 1b, compensating the Wobble effect resulting from the wobbling of the polygon mirror scanner 30.

However, if the optical scanning system is composed of all spherical lenses, then in the secondary plane, because the light source emits a light beam that passes through a cylindrical lens before polygon mirror scanner so that it can't form an optical conjugate relationship between object and the imaging surface, the Wobble effect can not be compensated. In addition, because there is few free variables, the scanning linearity of the light beam can't reach an order below 0.5% within the scope of ±105 mm (the width of A4 paper), and also the field curvature at the image side is very large. This kind of fΘ lens groups can not be used for high resolution laser printer.

As shown in FIG. 1a, a cylindrical lens is used for the purpose of improving the defects of the spherical lens for which the Wobble effect can not be calibrated. However, due to the rather large field curvature induced by the cylindrical lens on the secondary scanning plane, the cylindrical lens can be only placed near the image surface. Consequently, it requires a lot of space, and increases manufacturing costs at the same time.

SUMMARY OF THE INVENTION

Accordingly, it is an object of the present invention for solving problems described above to provide a one-piece fΘ-DEC scanning lens, which causes a light beam emitted by a light source and reflected by a polygon mirror scanner to make the scanning light beam moved on a plane project onto an image surface.

Moreover, the two non-rotational symmetrical surfaces of the one-piece lens are in accordance with the following mathematic equation:

$$Z = (C_x X^2 + C_y Y^2)/\{1 + SQRT[1 - (1 + K_x)C_x^2 X^2 - (1 + K_y)C_y^2 Y^2]\} + \Sigma A_n[(1 - A_n')X^2 + (1 + A_n')Y^2]$$

wherein, the origins of the coordinates are defined as apexes of the first surface and the second surface respectively, and the coordinates have X, Y, and Z axes which are perpendicular to each other, wherein the Z axis is in the direction of optic axis of the lens, furthermore, the scanning plane is defined as YZ plane, and the secondary scanning plane is defined as XZ plane, additionally, the curvature centers of the first surface and the second surface are defined as negative when they face the polygon mirror scanner, while they are defined as positive when they face the light-sensing drum;

X, Y, and Z are coordinates of the X, Y, Z axes respectively;

Cx and Cy are curvatures of the curved surfaces wherein the curve apexes are in XZ plane and YZ plane respectively;

Kx and Ky are conic coefficients in XZ plane and YZ plane respectively;

An and An' are the rotational symmetry coefficients of the 2n order and non-rotational symmetry coefficients of the 2n order respectively;

and the following criteria are met:

(1) $0.27 \leq f_x/f_y \leq 0.35$
(2) $|R_{1y}| > |R_{2y}|$
(3) $0.3 < R_{2x}/R_{2y} < 0.6$, $R_{1x}/R_{1y} \leq 0$ wherein, fx represents the focal length in XZ plane;
fy represents the focal length in YZ plane;
R1y represents the radius of curvature of the first surface in YZ plane;
R2y represents the radius of curvature of the second surface in YZ plane;
R1x represents the radius of curvature of the first surface in XZ plane;
R2x represents the radius of curvature of the second surface in XZ plane.

And the one-piece fΘ-DEC scanning lens is capable of being manufactured from acrylic resin or molded glass.

According to the one-piece fΘ-DEC scanning lens of the present invention, because there is only one piece of lens, the structure can be simplified greatly, and costs can be greatly reduced by using plastic ejection or glass molding for manufacturing it. Additionally, due to the simplicity of the mechanism of the one-piece fΘ-DEC scanning lens and because of its proximity to the polygon mirror scanner, it can be assembled easily, so thereby reducing assembly errors. Furthermore, the one-piece fΘ-DEC scanning lens of the present invention has better linearity and can more readily calibrate the curvature of field than conventional fΘ scanning lens group containing spherical or cylindrical lenses.

BRIEF DESCRIPTION OF THE DRAWINGS

The present invention can be better understood with reference to the following description and accompanying drawings of preferred embodiments of the present invention:

FIG. 2b is a top view of FIG. 2a;

FIG. 2c is a side view of FIG. 2a;

DETAILED DESCRIPTION OF THE PREFERRED EMBODIMENTS

Figure 1A:
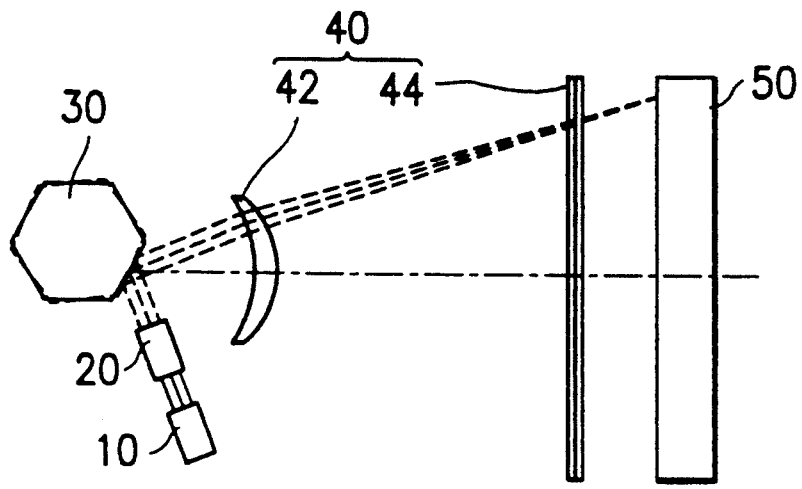
FIG. 1a is a schematic diagram which shows a conventional two-element fΘ lens group used in a laser printer.
Figure 1B:
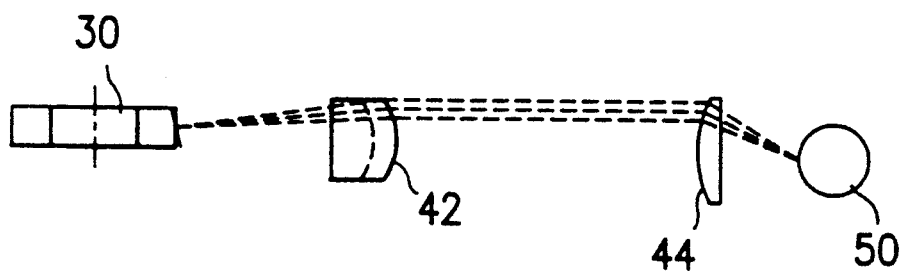
FIG. 1b shows that the conventional two-element fΘ lens have the effect of compensating the Wobble effect.
Figure 2A:
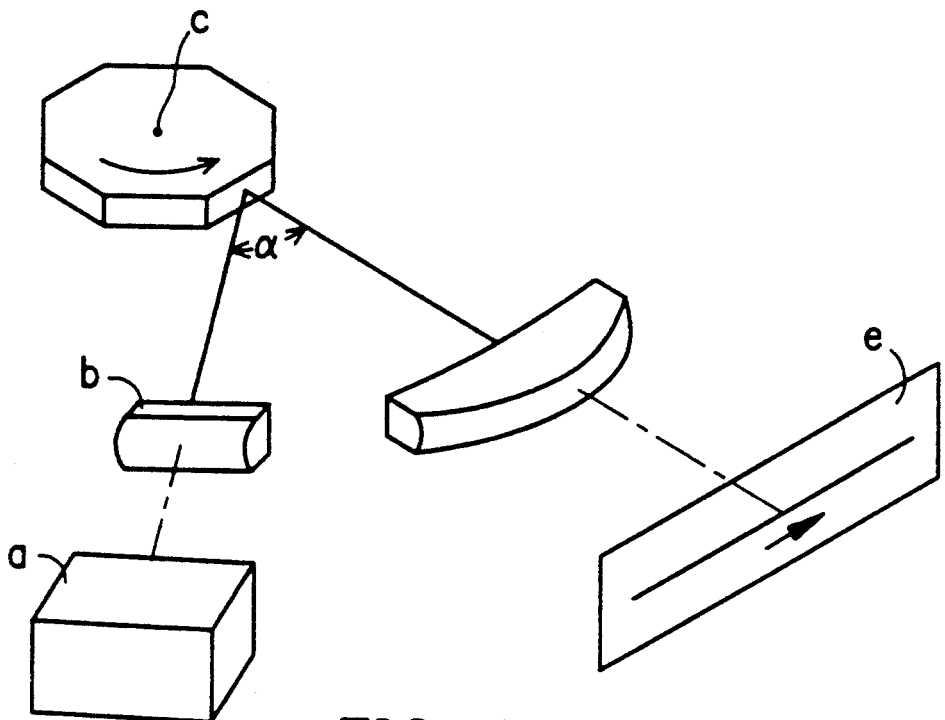
FIG. 2a is an schematic diagram showing the shape of the one-piece fΘ-DEC scanning lens of the present invention.
Figure 2B:
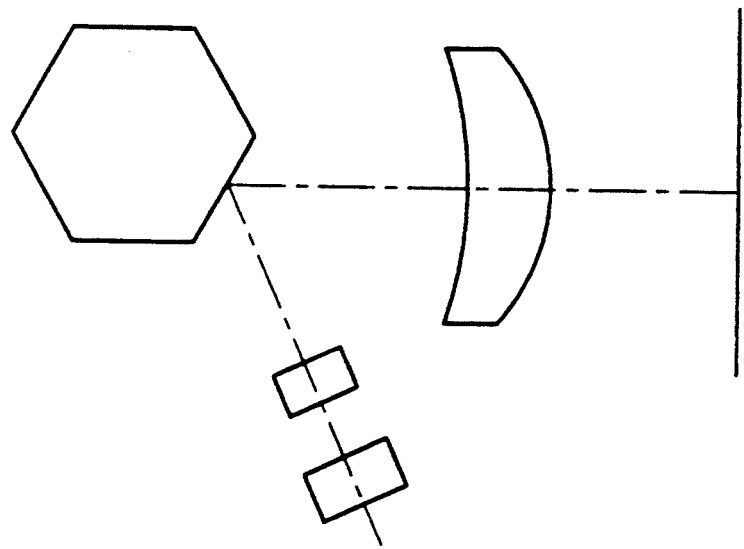
Figure 2C:
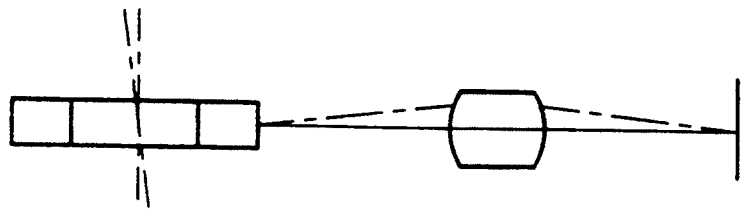

Referring to FIG. 1a, FIG. 1b, FIG. 2a, FIG. 2b, and FIG. 2c, according to the present invention, there provides a one-piece double-surface anamorphic lens to replace the conventional fΘ scanning lens containing at least two pieces of lens, the present invention maintains good linearity while scanning at a big angle, compensates for the Wobble effect. Both of the first surface and the second surface of the present invention have to be in accordance with the following equation:

$$Z = (C_x X^2 + C_y Y^2)/\{1 + SQRT[1 - (1 + K_x)C_x^2 X^2 - (1 + K_y)C_y^2 Y^2]\} + \Sigma A_n[(1 - A_n')X^2 + (1 + A_n')Y^2]$$

wherein, the origins of coordinates are defined as the apexes of the first surface and the second surface respectively, and the coordinates have X, Y, and Z axes which are perpendicular to each other, at the same time, the scanning plane is defined as YZ plane, and the secondary scanning plane is defined as XZ plane;

X, Y, and Z are the coordinates of the X, Y, Z axes respectively;

$C_x$ and $C_y$ are the curvatures of the curved surfaces wherein the curve apexes are in XZ plane and YZ plane respectively;

$K_x$ and $K_y$ are the conic coefficients in XZ plane and YZ plane respectively;

$A_n$ and $A_n'$ are the rotational symmetry coefficients of the 2n order and the non-rotational symmetry coefficients of the 2n order respectively.

Additionally, the mold of the one-piece fΘ-DEC scanning lens of the present invention may be made by a digital controlled machine first, then shaped from acrylic resin injection or molding glass processing.

Furthermore, not only must the one-piece fΘ-DEC scanning lens be in accordance with the equation of the non-rotational symmetrical anamorphic surface described above, it has to satisfy the following criteria:

(1) $0.27 \leq f_x/f_y \leq 0.35$ (2) $|R_{1y}| > |R_{2y}|$ (3) $0.3 < R_{2x}/R_{2y} < 0.6$, $R_{1x}/R_{1y} \leq 0$ wherein, $f_x$ represents the focal length in XZ plane;

$f_y$ represents the focal length in YZ plane;

$R_{1y}$ represents the curvature radius of the first surface in YZ plane where the center of curvature on the same side as the incidence beam is defined as a negative value;

$R_{2y}$ represents the curvature radius of the second surface in YZ plane where the center of curvature on the same side as the incidence beam is defined as a negative value;

$R_{1x}$ represents the curvature radius of the first surface in XZ plane;

$R_{2x}$ represents the curvature radius of the second surface in XZ plane.

As described above, for the purpose of compensating the Wobble effect of the polygon mirror scanner, a scanning lens has to re-focus the incident light beam which has been focused on a position of the polygon mirror scanner on the secondary scanning plane, while the light beam which is incident onto the one-piece lens in the scanning plane is parallel, the one-piece fΘ-DEC scanning lens has to be a non-rotational symmetrical anamorphic lens, wherein the focal length of the secondary scanning plane has to be shorter than that of the scanning plane.

Moreover, as the increment of the scanning angle, the distance between the object and the parallel axial image plane increases. In order to focus the light beam into a straight line on the image plan, we increase the focal length as the increment of off axis. By the way, radii of the curved surfaces in the scanning plane and the secondary scanning plane have to match each other to eliminate the astigmatism.

Furthermore, we have to eliminate the field curvature on the scanning plane and the linearity of light spot scanning has to be satisfied, which may be accomplished by adjusting the 2n order rotational symmetry coefficients An and the conic coefficients Ky.

Additionally, the field curvature of the secondary scanning plane and the field curvature induced by a non-symmetrical incidence light beam relative the optical axis on the secondary scanning plane may be ameliorated by appropriate adjustments of 2n order non-rotational symmetry coefficients An' and the conic coefficient Kx.

Therefore, the left side of the criterion (1) limits the astigmatism between the scanning plane and the secondary scanning plane. If fx/fy<0.27, then the scanning plane and the secondary scanning plane isn't able to be focused at the same position. The right side of the criterion (1) is designed for compensating the Wobble effect. If fx/fy>0.4, then an optical conjugate relationship between the image surface and the polygon mirror scanner can not be formed.

The criterion (2) is designed for forming a meniscus lens in the scanning direction so as to obtain optimal linear scanning.

When the conditions match the criterion (3), i.e. $0.3 < R_{2x}/R_{2y} < 0.6$ and $R_{1x}/R_{1y} \leq 0$, the focal length of the scanning lens increases by the increment of the scanning angle so as to reconcile the increment of imaging length while the scanning angle increases.

The First Embodiment

| | |
|---|---|
| $R_{1x} = 406.93263$ | $R_{2x} = -59.78571$ |
| $R_{1y} = -630.91007$ | $R_{2y} = -132.10381$ |
| $K_{1x} = -10.00$ | $K_{2x} = -3.913913$ |
| $K_{1y} = -10.00$ | $K_{2y} = -8.451807$ |
| $A_4 = 0.390372 * 10^{-6}$ | $A_4 = 0.104613 * 10^{-5}$ |
| $A_6 = -0.15639 * 10^{-9}$ | $A_6 = -0.213423 * 10^{-1}$ |
| $A_8 = 0.127402 * 10^{-12}$ | $A_8 = 0.574345 * 10^{-13}$ |
| $A_{10} = -0.219183 * 10^{-16}$ | $A_{10} = -0.130213 * 10^{-17}$ |
| $A_4' = 0.360964 * 10^{-1}$ | $A_4' = -0.193208$ |
| $A_6' = -0.215953 * 10^{-1}$ | $A_6' = -0.199579$ |
| $A_8' = -0.191311$ | $A_8' = -0.234940$ |
| $A_{10}' = -0.274678$ | $A_{10}' = -0.294271$ |
| $fx = 72.8925$ | $fy = 219.9346$ |
| $fx/fy = 0.3314$ | |
| $R_{1x}/R_{1y} = -0.65$ | |
| $R_{2x}/R_{2y} = 0.453$ | |
| $n = 1.748$ | |
| $\alpha_{12} = 34.304380$ | |

The Second Embodiment

| | |
|---|---|
| $R_{1x} = 93.74298$ | $R_{2x} = -43.10373$ |
| $R_{1y} = -5.00$ | $R_{2y} = -94.15558$ |
| $K_{1x} = -5.00$ | $K_{2x} = -1.861527$ |
| $K_{1y} = -5.00$ | $K_{2y} = -5.00$ |
| $A_4 = 0.279854 * 10^{-5}$ | $A_4 = 0.113199 * 10^{-5}$ |
| $A_6 = -0.378856 * 10^{-9}$ | $A_6 = -0.216416 * 10^{-9}$ |
| $A_8 = 0.899941 * 10^{-13}$ | $A_8 = 0.515769 * 10^{-13}$ |
| $A_{10} = -0.156021 * 10^{-15}$ | $A_{10} = -0.124256 * 10^{-10}$ |
| $A_4' = -0.778294 * 10^{-1}$ | $A_4' = -0.186424$ |
| $A_6' = -0.141291 * 10$ | $A_6' = -0.237363$ |
| $A_8' = -0.34693$ | $A_8' = -0.230256$ |
| $A_{10}' = -0.597284$ | $A_{10}' = -0.100976 * 10$ |
| $fx = -46.18014$ | $fy = 148.6165$ |
| $fx/fy = 0.31073$ | |
| $R_{1x}/R_{1y} = -0.1874$ | |
| $R_{2x}/R_{2y} = 0.46$ | |
| $n = 1.755$ | |
| $\alpha_{12} = 45.418947$ | |

The Third Embodiment

| | |
|---|---|
| $R_{1x} = 93.69680$ | $R_{2x} = -46.13218$ |
| $R_{1y} = \infty$ | $R_{2y} = -105.29826$ |
| $K_{1x} = -7.112595$ | $K_{2x} = -2.369190$ |
| $K_{1y} = 0.00$ | $K_{2y} = -5.626672$ |
| $A_4 = 0.484791 * 10^{-5}$ | $A_4 = 0.110781 * 10^{-5}$ |
| $A_6 = -0.130544 * 10^{-9}$ | $A_6 = -0.215229 * 10^{-9}$ |
| $A_8 = 0.118533 * 10^{-12}$ | $A_8 = 0.461392 * 10^{-13}$ |
| $A_{10} = -0.295810 * 10^{-16}$ | $A_{10} = -0.370568 * 10^{-11}$ |
| $A_4' = -0.1926560$ | $A_4' = -0.211317$ |
| $A_6' = -0.101338$ | $A_6' = -0.256384$ |
| $A_8' = -0.188047$ | $A_8' -0.242659$ |
| $A_{10}' = -0.268447$ | $A_{10}' = -0.100443 * 10$ |
| $fx = 72.8168$ | $fy = 219.3714$ |
| $fx/fy = 0.3319$ | |
| $R_{1x}/R_{1y} = 0$ | |
| $R_{2x}/R_{2y} = 0.438$ | |
| $n = 1.488$ (PMMA) | |

$\alpha_{12} = 49.831015$

The Fourth Embodiment

| | |
|---|---|
| $R_{1x} = 300.00$ | $R_{2x} = -61.60710$ |
| $R_{1y} = -436.43123$ | $R_{2y} = -12.57958$ |
| $K_{1x} = -5.00$ | $K_{2x} = -4.129358$ |
| $K_{1y} = -8.816549$ | $K_{2y} = -5.00$ |
| $A_4 = 0.358702 * 10^{-6}$ | $A_4 = 0.916578 * 10^{-6}$ |
| $A_6 = -0.143543 * 10^{-9}$ | $A_6 = -0.173159 * 10^{-9}$ |
| $A_8 = 0.141909 * 10^{-12}$ | $A_8 = 0.520766 * 10^{-13}$ |
| $A_{10} = -0.264976 * 10^{-16}$ | $A_{10} = -0.473606 * 10^{-17}$ |
| $A_4' = -0.991372$ | $A_4' = -0.232230$ |
| $A_6' = -0.484315 * 10^{-1}$ | $A_6' = -0.279382$ |
| $A_8' = -0.171790$ | $A_8' = -0.242028$ |
| $A_{10}' = -0.240744$ | $A_{10}' = -0.607350$ |
| $fx = 72.09425$ | $fy = 220.1074$ |
| $fx/fy = 0.32754$ | |
| $R_{1x}/R_{1y} = -0.68$ | |
| $R_{2x}/R_{2y} = 0.5026$ | |
| $n = 1.747$ | |
| $\alpha_{12} = 35.00$ | |

The Fifth Embodiment

| | |
|---|---|
| $R_{1x} = 135.52802$ | $R_{2x} = -48.32417$ |
| $R_{1y} = -500.00$ | $R_{2y} = -104.06625$ |
| $K_{1x} = -4.998135$ | $K_{2x} = -2.663759$ |
| $K_{1y} = -2.914243$ | $K_{2y} = -4.230636$ |
| $A_4 = 0.369655 * 10^{-7}$ | $A_4 = 0.580857 * 10^{-6}$ |
| $A_6 = -0.690822 * 10^{-8}$ | $A_6 = -0.315204 * 10^{-9}$ |
| $A_8 = 0.255742 * 10^{-12}$ | $A_8 = 0.553929 * 10^{-13}$ |
| $A_{10} = -0.158252 * 10^{-15}$ | $A_{10} = -0.124256 * 10^{-10}$ |
| $A_4' = -0.351460 * 10$ | $A_4' = -0.130739 * 10^{-1}$ |
| $A_6' = -0.998587$ | $A_6' = -0.480545$ |
| $A_8' = -0.262084$ | $A_8' = -0.191870$ |
| $A_{10}' = -0.375369$ | $A_{10}' = -0.100461$ |
| $fx = 52.04957$ | $fy = 170$ |
| $fx/fy = 0.30$ | |
| $R_{1x}/R_{1y} = -0.27$ | |
| $R_{2x}/R_{2y} = 0.464$ | |
| $n = 1.755$ | |
| $\alpha_{12} = 35$ | |

The Sixth Embodiment

| | |
|---|---|
| $R_{1x} = 113.12043$ | $R_{2x} = -67.23254$ |
| $R_{1y} = -500.00$ | $R_{2y} = -118.21493$ |
| $K_{1x} = 5.00$ | $K_{2x} = -4.686217$ |
| $K_{1y} = -4.943705$ | $K_{2y} = -4.402186$ |
| $A_4 = 0.762604 * 10^{-10}$ | $A_4 = 0.493075 * 10^{-6}$ |
| $A_6 = 0.316243 * 10^{-10}$ | $A_6 = -0.231889 * 10^{-9}$ |
| $A_8 = 0.650418 * 10^{-14}$ | $A_8 = 0.993421 * 10^{-14}$ |
| $A_{10} = -0.846617 * 10^{-17}$ | $A_{10} = -0.124256 * 10^{-10}$ |
| $A_4' = -50.2535$ | $A_4' = -0.0816095$ |
| $A_6' = -0.312067$ | $A_6' = -0.567149$ |
| $A_8' = -0.419150$ | $A_8' = -0.018907$ |
| $A_{10}' = -0.153908$ | $A_{10}' = -0.100446$ |
| $fx = 61.7214$ | $fy = 200.00$ |
| $fx/fy = 0.30861$ | |
| $R_{1x}/R_{1y} = -0.226$ | |
| $R_{2x}/R_{2y} = 0.5687$ | |
| $n = 1.755$ | |
| $\alpha_{12} = 35$ | |

The Seventh Embodiment

| | |
|---|---|
| $R_{1x} = 305.64889$ | $R_{2x} = -55.47301$ |
| $R_{1y} = -508.56074$ | $R_{2y} = -121.01814$ |
| $K_{1x} = -5.00$ | $K_{2x} = -3.318491$ |
| $K_{1y} = -5.00$ | $K_{2y} = -5.0$ |
| $A_4 = 0.355285 * 10^{-6}$ | $A_4 = 0.944607 * 10^{-6}$ |
| $A_6 = -0.140816 * 10^{-9}$ | $A_6 = -0.174606 * 10^{-9}$ |
| $A_8 = 0.138539 * 10^{-12}$ | $A_8 = 0.588299 * 10^{-13}$ |
| $A_{10} = -0.272354 * 10^{-16}$ | $A_{10} = -0.825631 * 10^{-18}$ |
| $A_4' = -0.229758 * 10^{-1}$ | $A_4' = -0.239596$ |
| $A_6' = -0.583971 * 10^{-1}$ | $A_6' = -0.250805$ |
| $A_8' = -0.173879$ | $A_8' = -0.229826$ |
| $A_{10}' = -0.243047$ | $A_{10}' = -0.382492$ |
| $fx = 69.3140$ | $fy = 219.1467$ |
| $fx/fy = 0.316290411$ | |
| $R_{1x}/R_{1y} = -0.6$ | |
| $R_{2x}/R_{2y} = 0.458$ | |
| $n = 1.7105$ | |
| $\alpha_{12} = 30.542322$ | |

Figure 3:
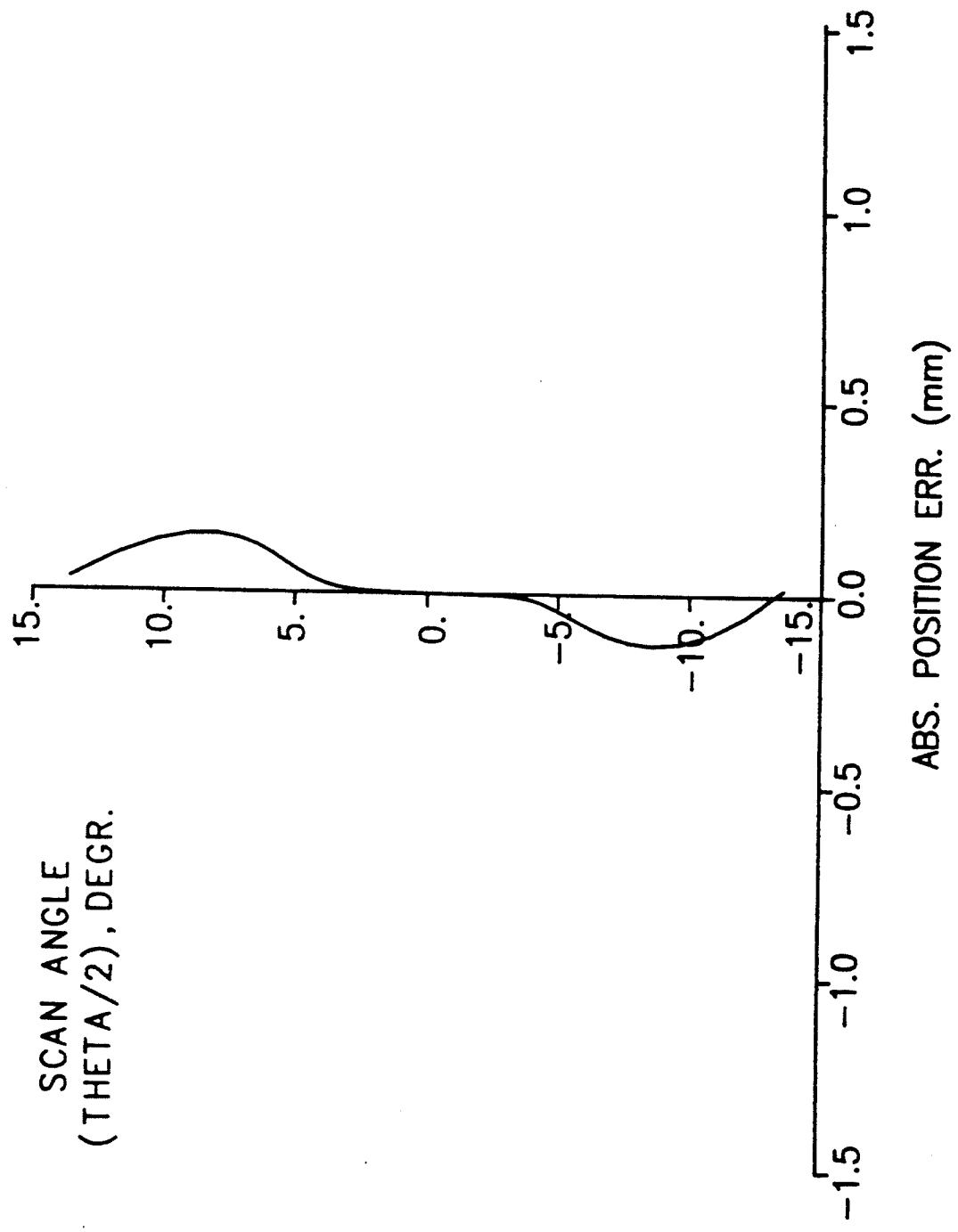
FIG. 3 is a curve diagram showing the scanning linearity characteristics of the first embodiment of the present invention.
Figure 4:
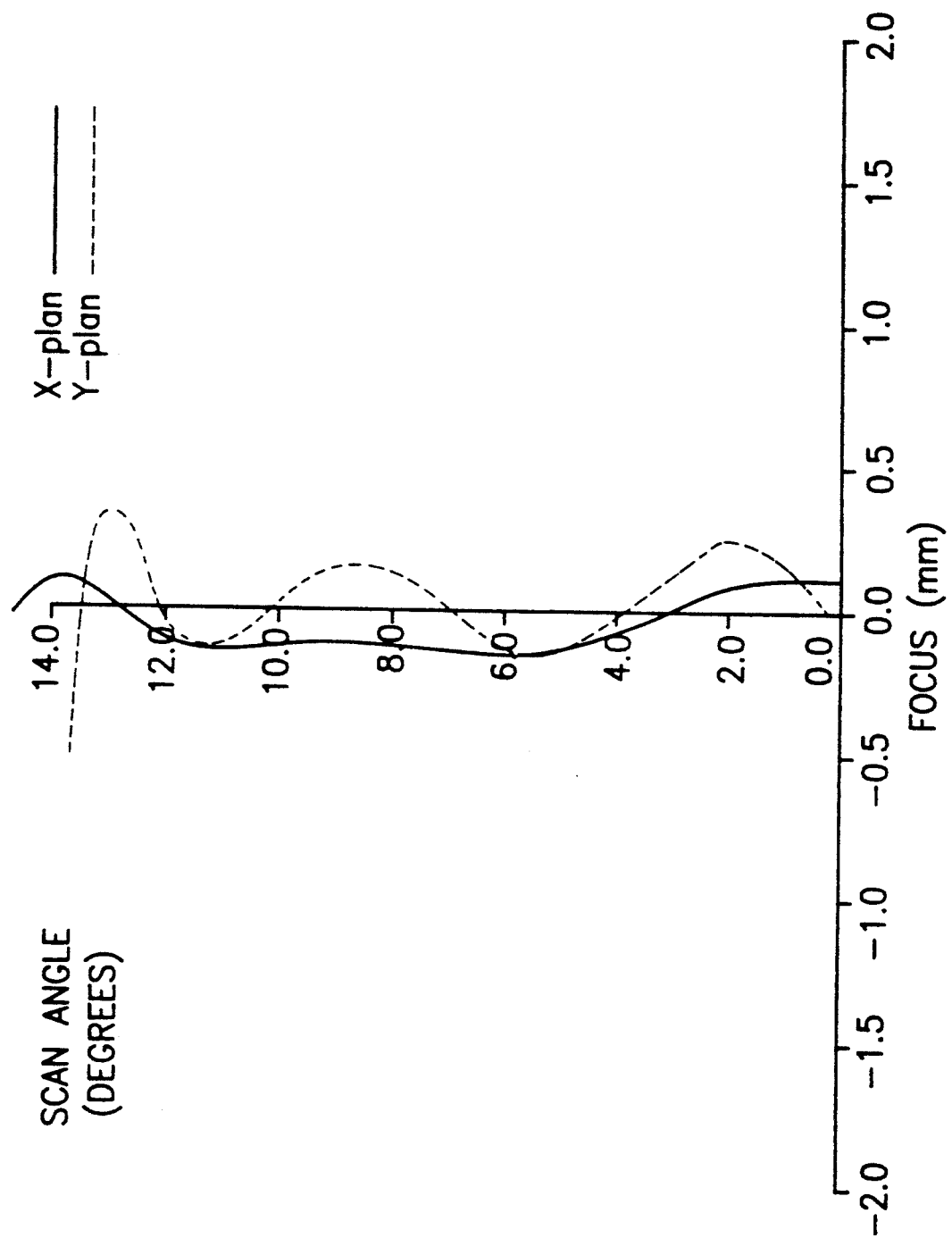
FIG. 4 is a curve diagram showing the field curvature of the first embodiment of the present invention.
Figure 5:
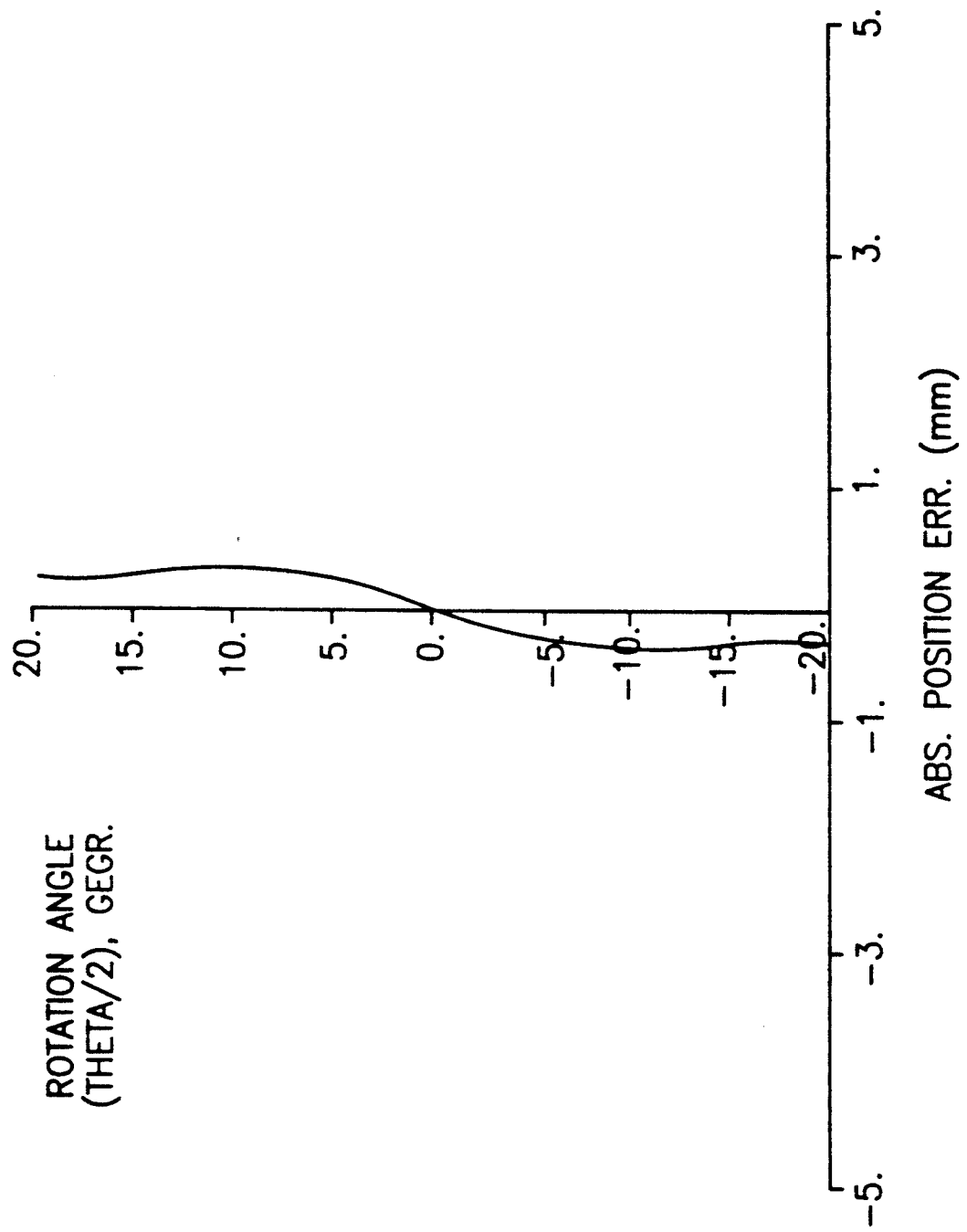
FIG. 5 is a curve diagram showing the scanning linearity characteristics of the second embodiment of the present invention.
Figure 6:
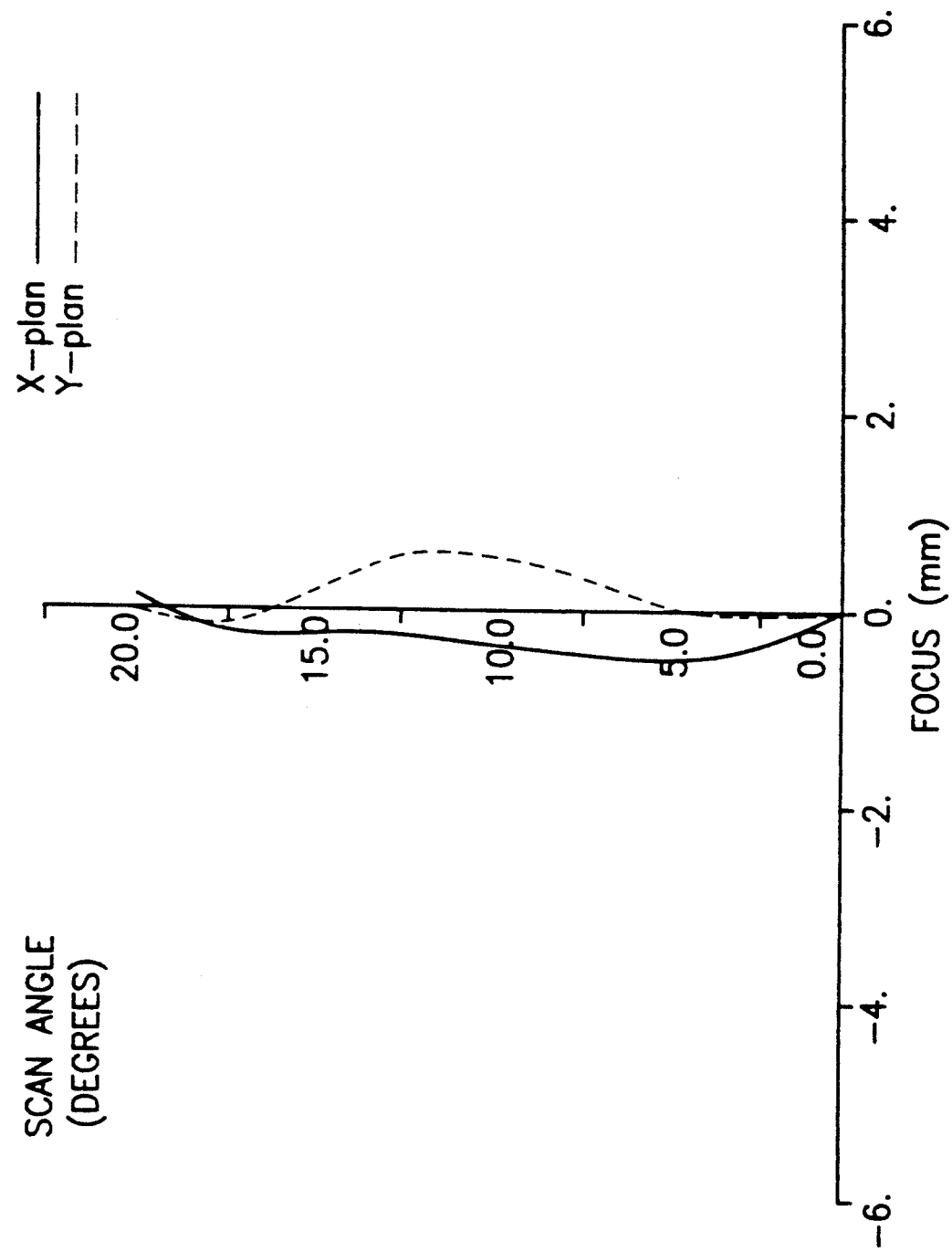
FIG. 6 is a curve diagram showing the field curvature of the second embodiment of the present invention.
Figure 7:
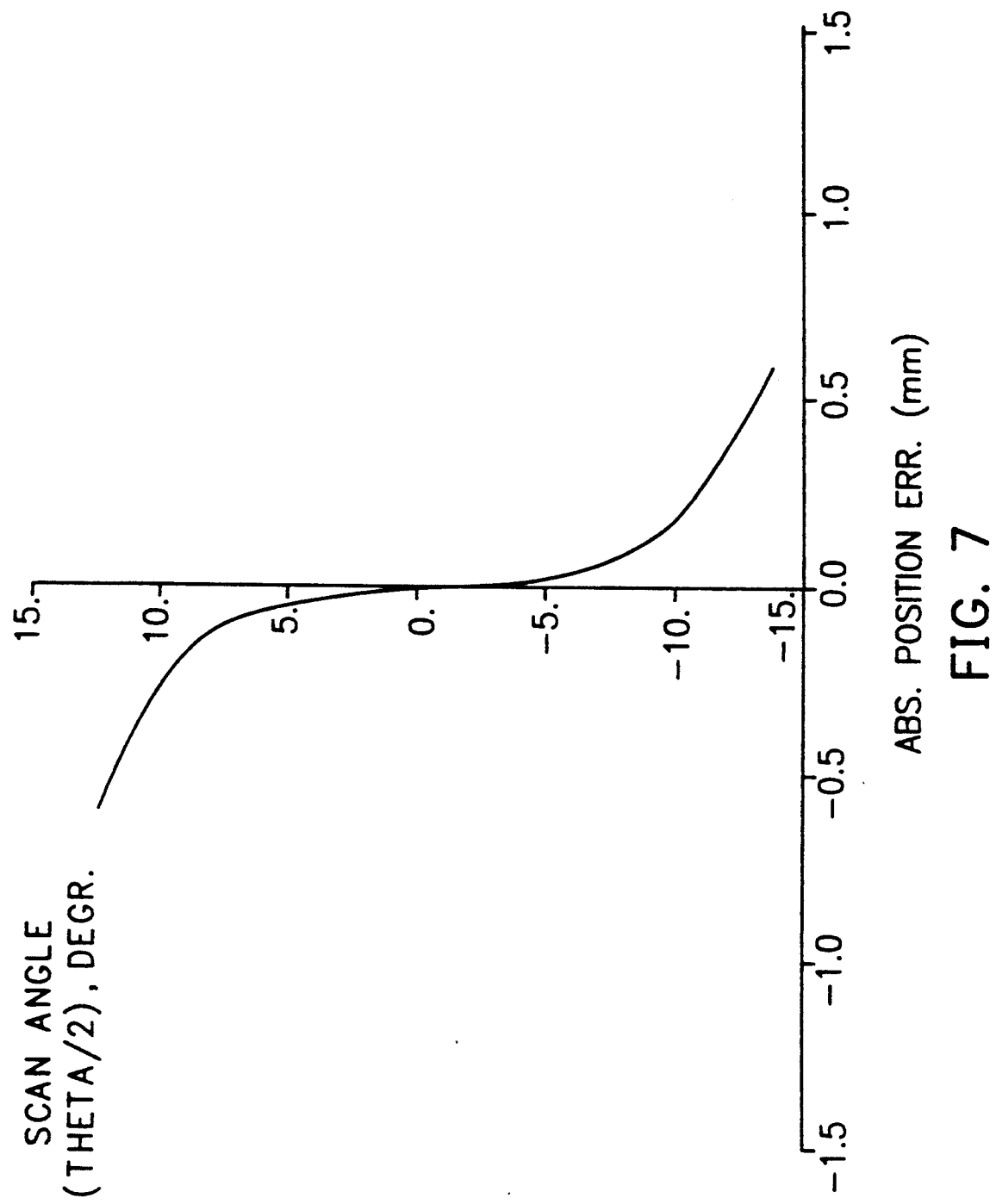
FIG. 7 is a curve diagram showing the scanning linearity characteristics of the third embodiment of the present invention.
Figure 8:
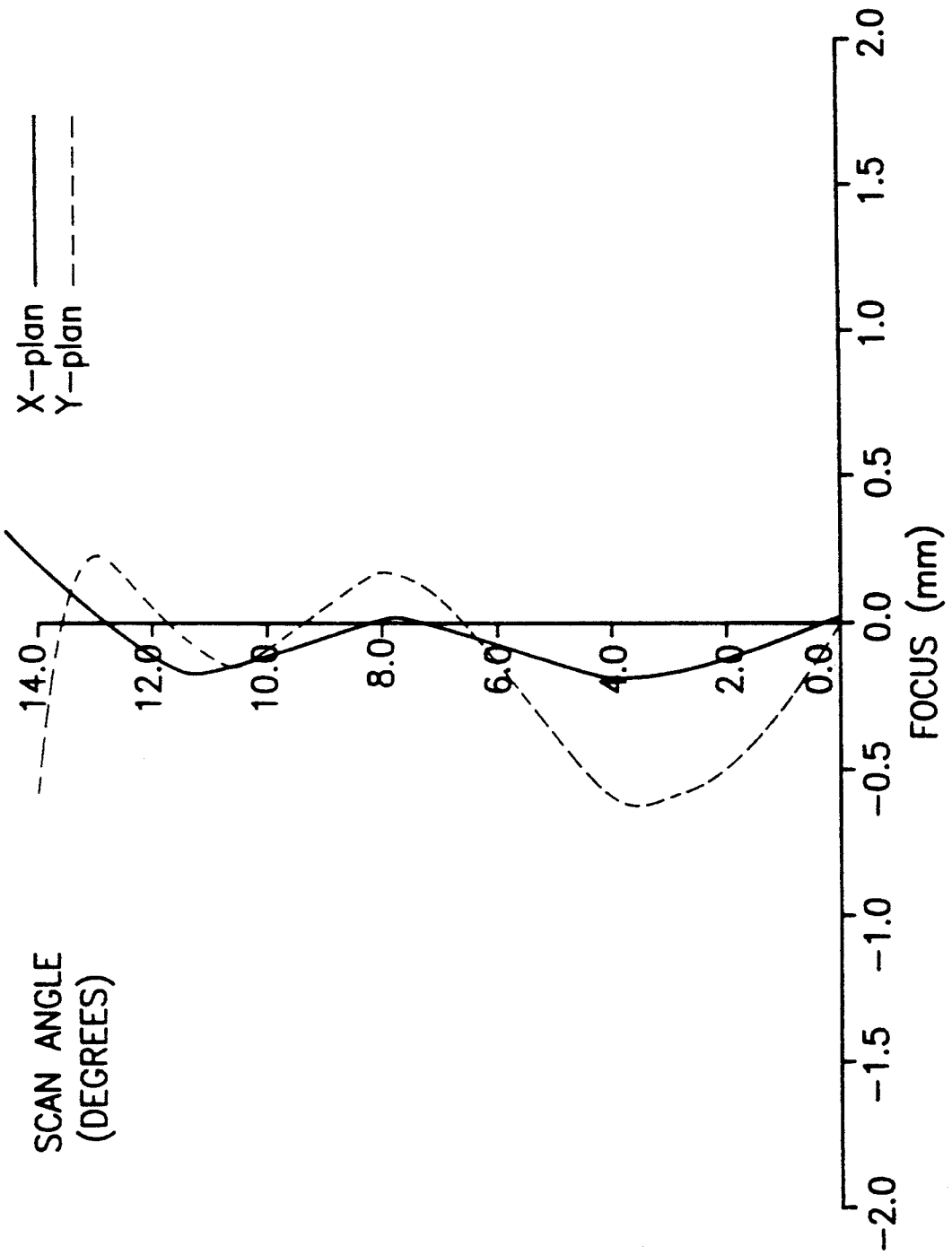
FIG. 8 is a curve diagram showing the field curvature of the third embodiment of the present invention.
Figure 9:
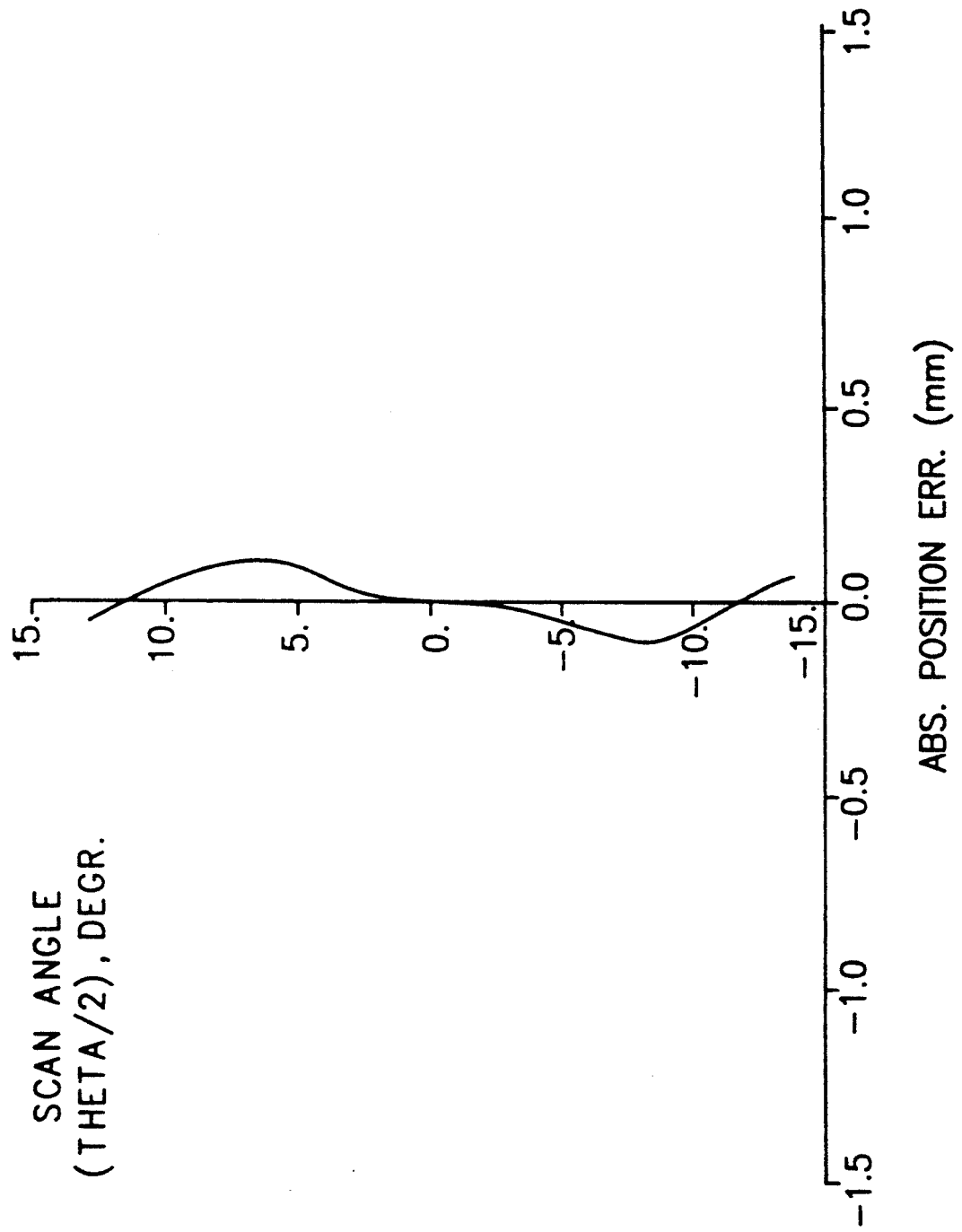
FIG. 9 is a curve diagram showing the scanning linearity characteristics of the fourth embodiment of the present invention.
Figure 10:
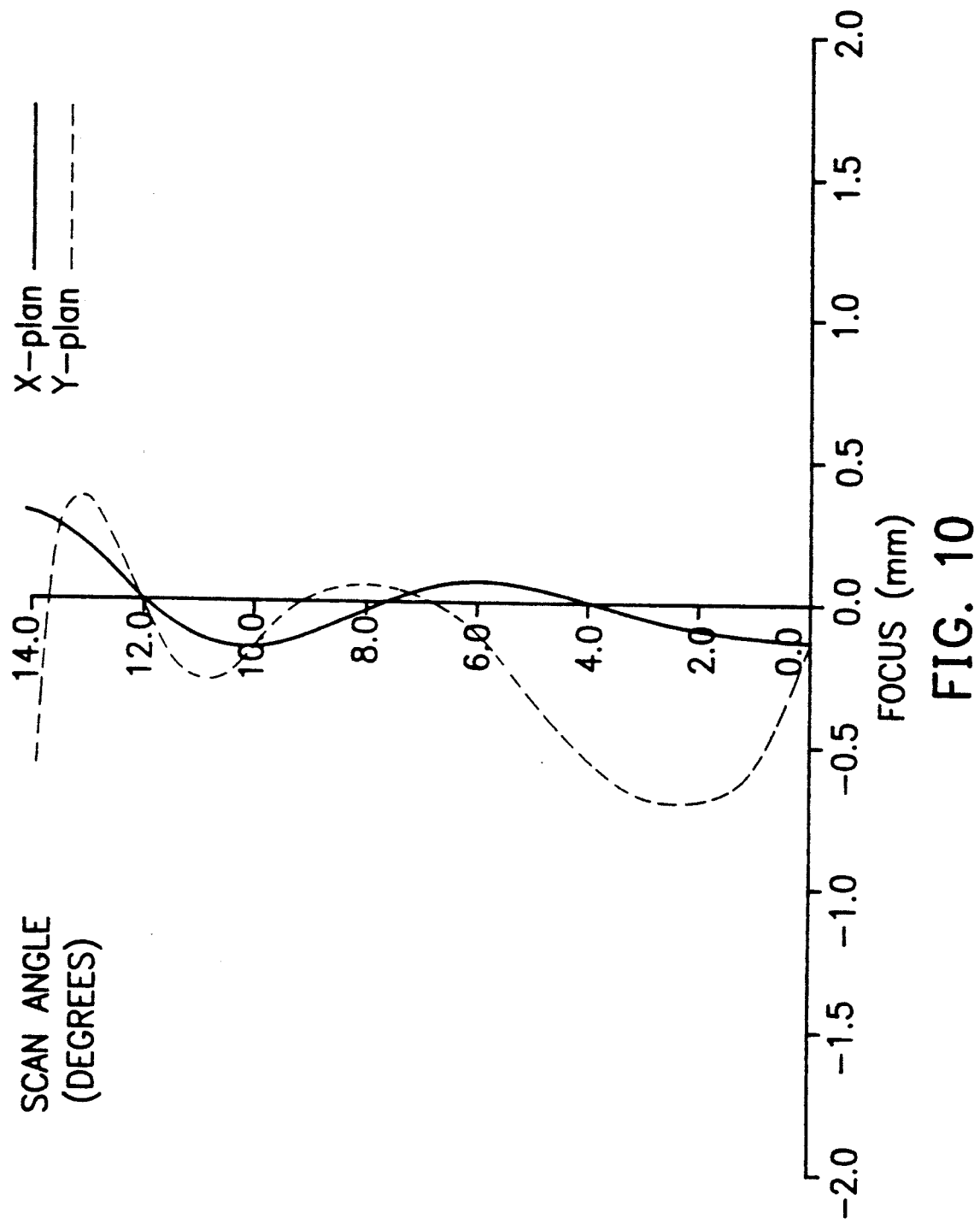
FIG. 10 is a curve diagram showing the field curvature of the fourth embodiment of the present invention.
Figure 11:
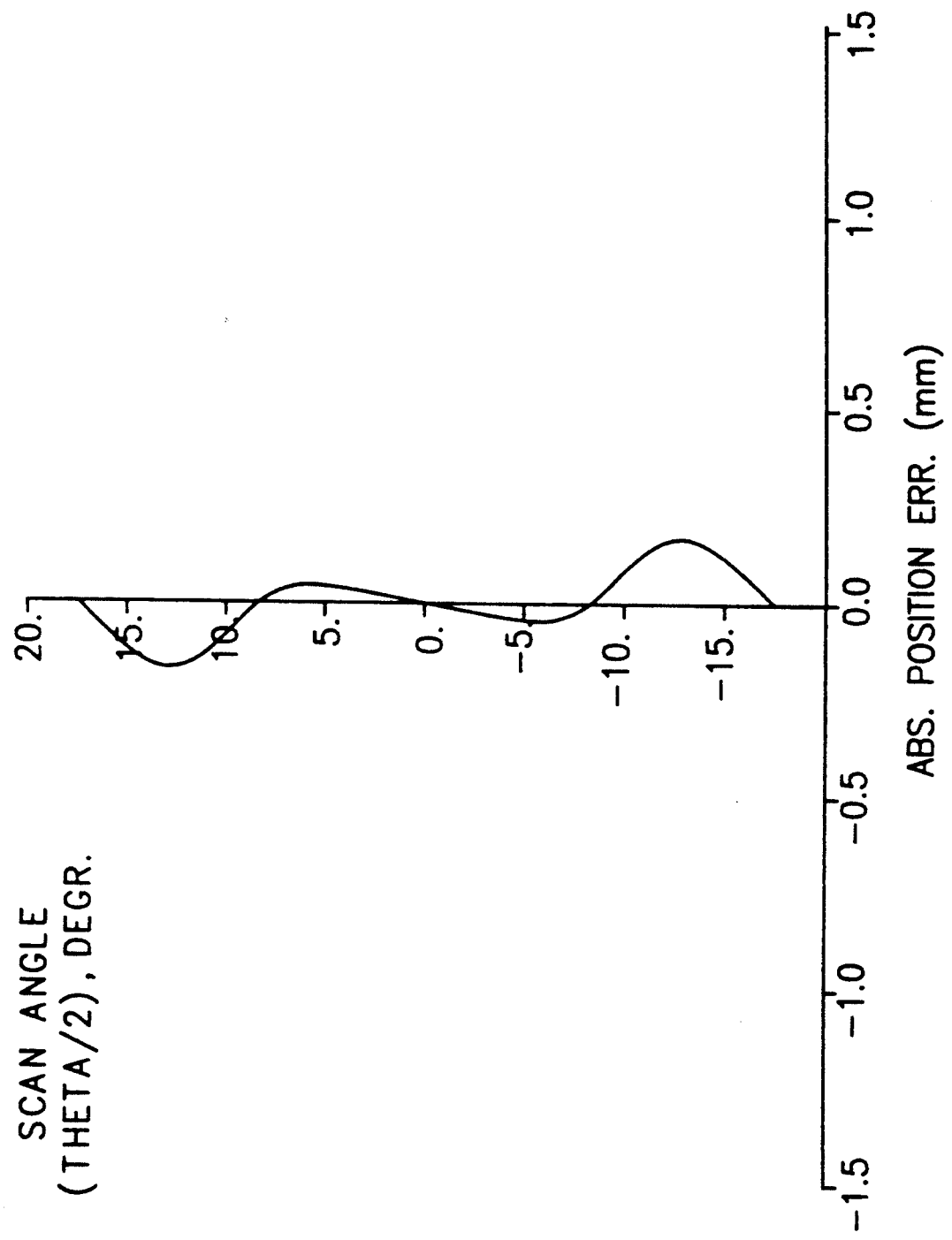
FIG. 11 is a curve diagram showing the scanning linearity characteristics of the fifth embodiment of the present invention.
Figure 12:
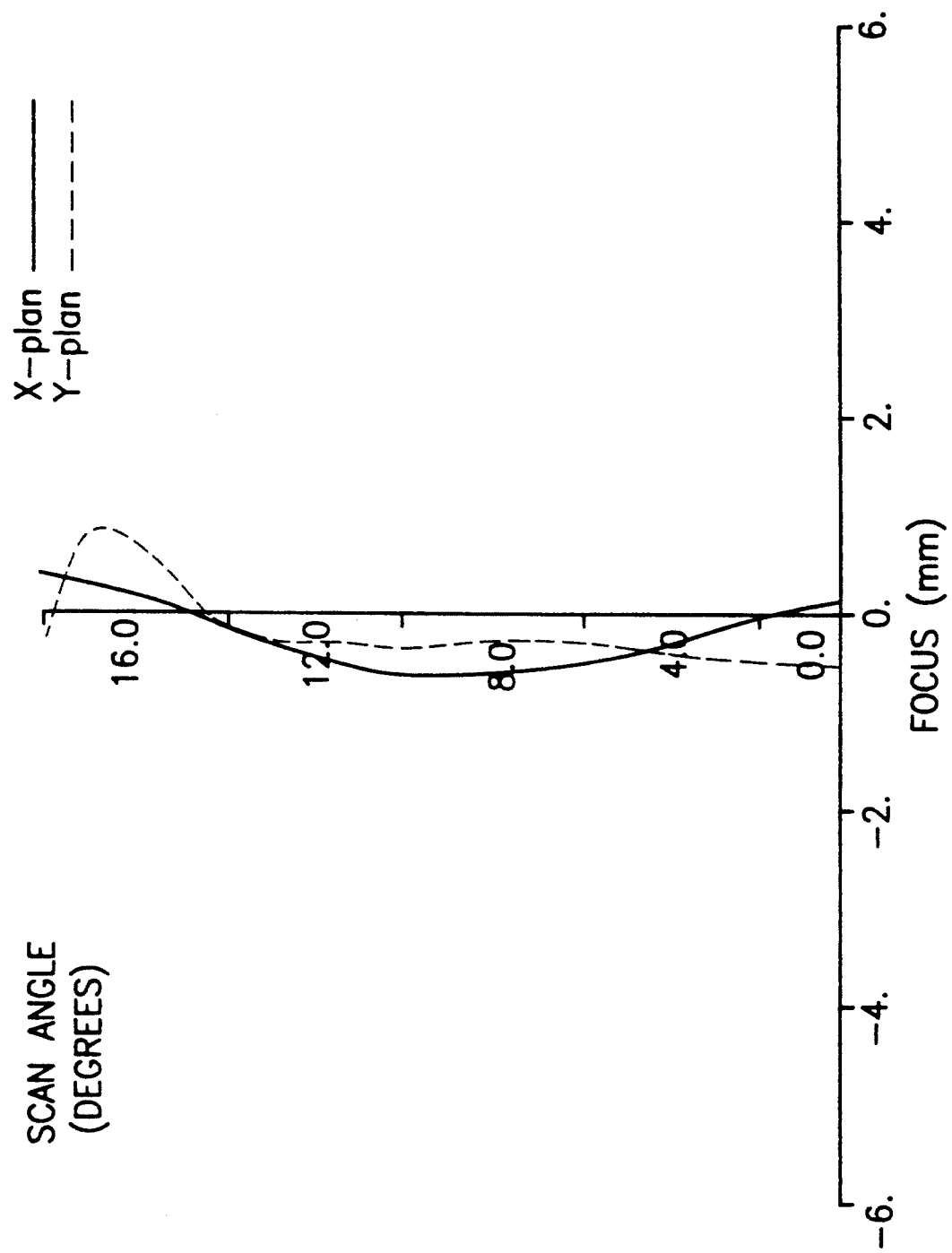
FIG. 12 is a curve diagram showing the field curvature of the fifth embodiment of the present invention.
Figure 13:
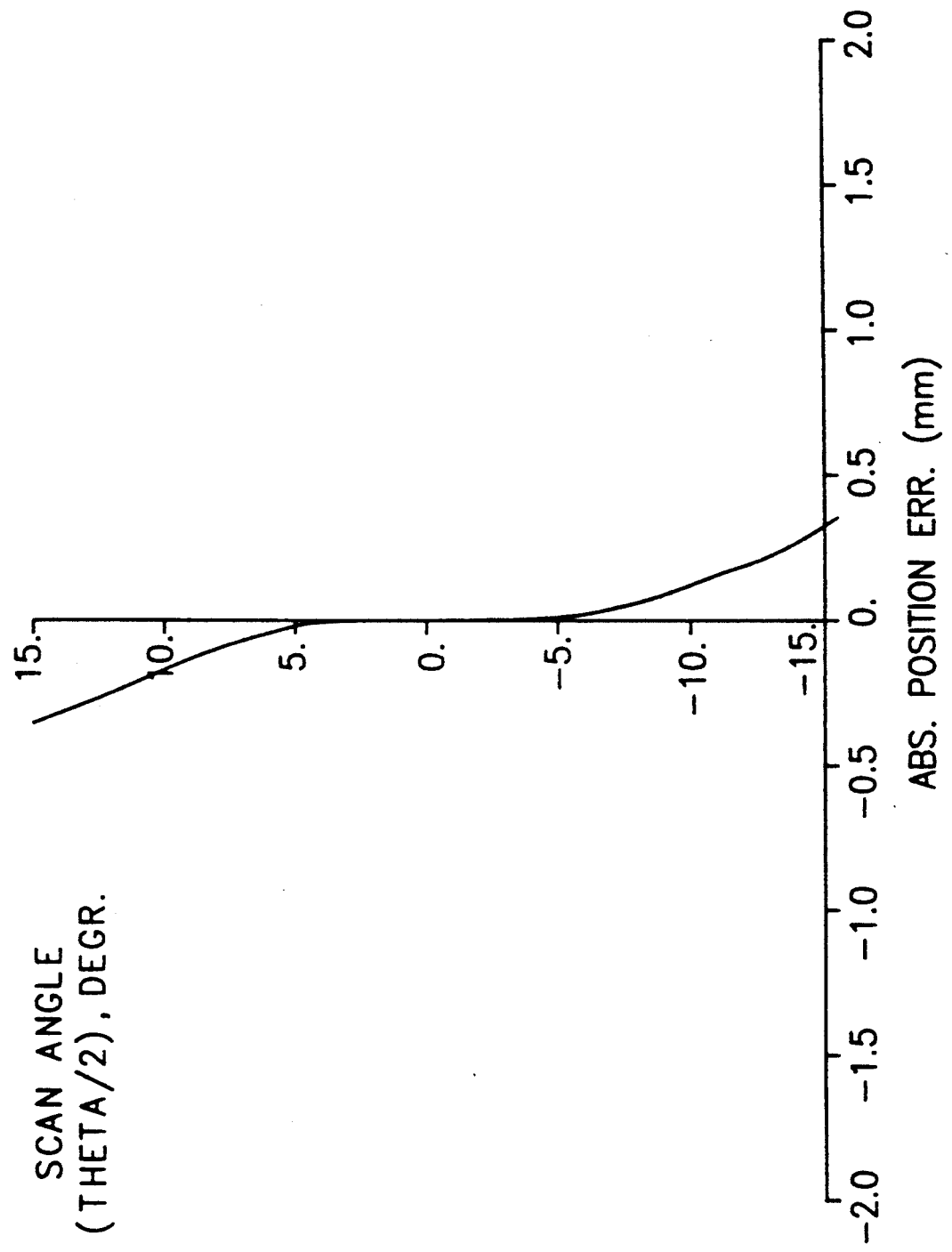
FIG. 13 is a curve diagram showing the scanning linearity characteristics of the sixth embodiment of the present invention.
Figure 14:
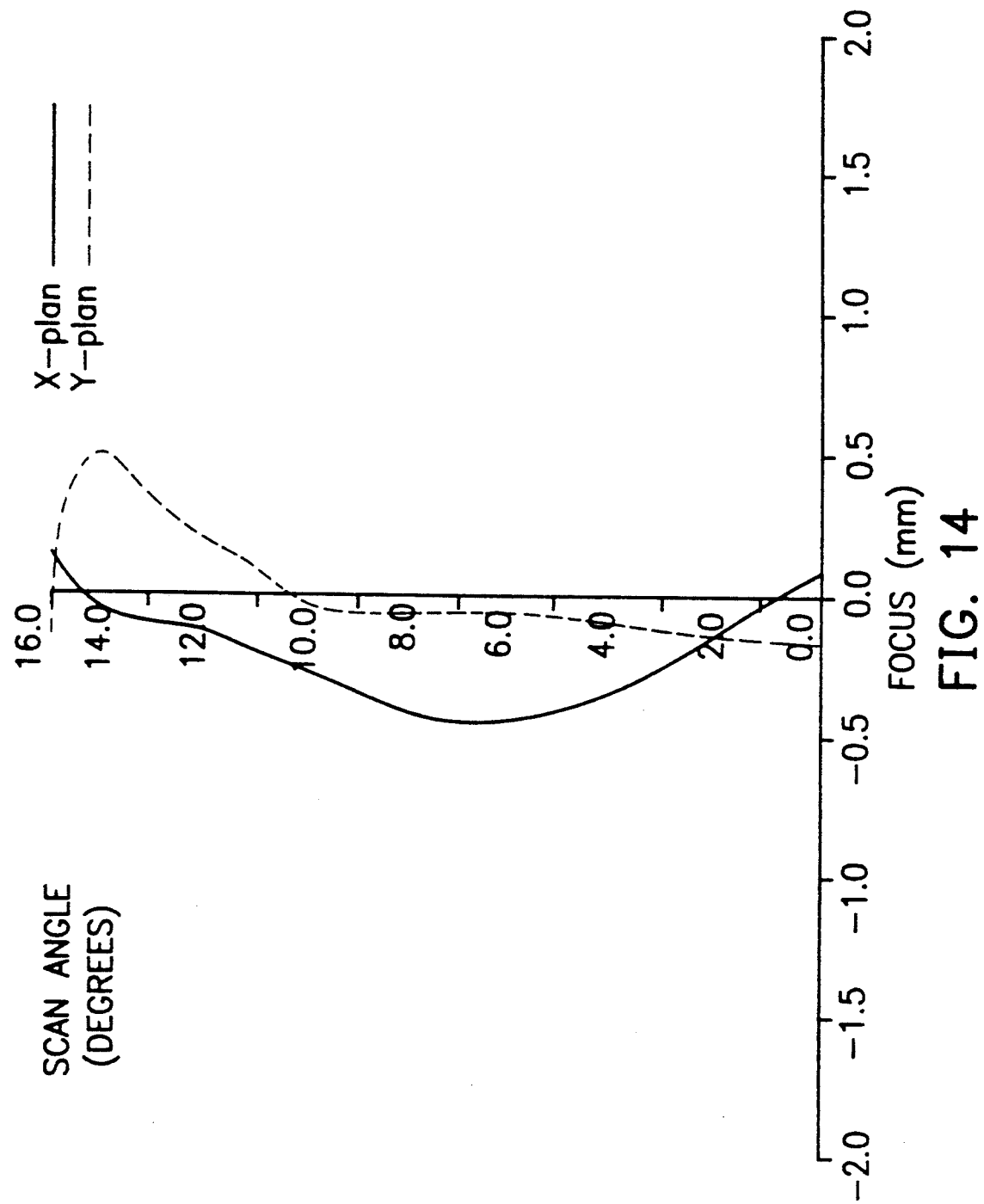
FIG. 14 is a curve diagram showing the field curvature of the sixth embodiment of the present invention.
Figure 15:
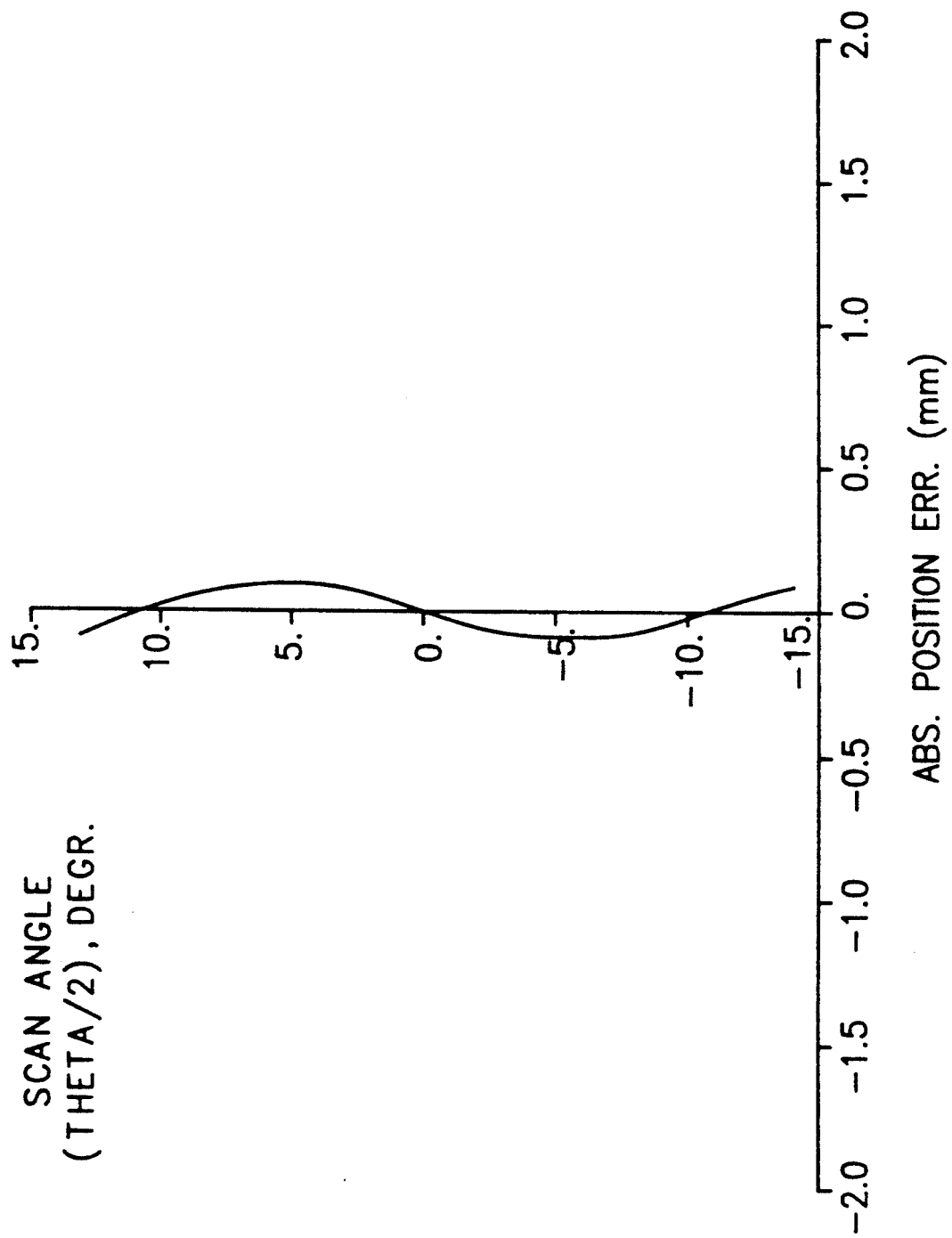
FIG. 15 is a curve diagram showing the scanning linearity characteristics of the seventh embodiment of the present invention.
Figure 16:
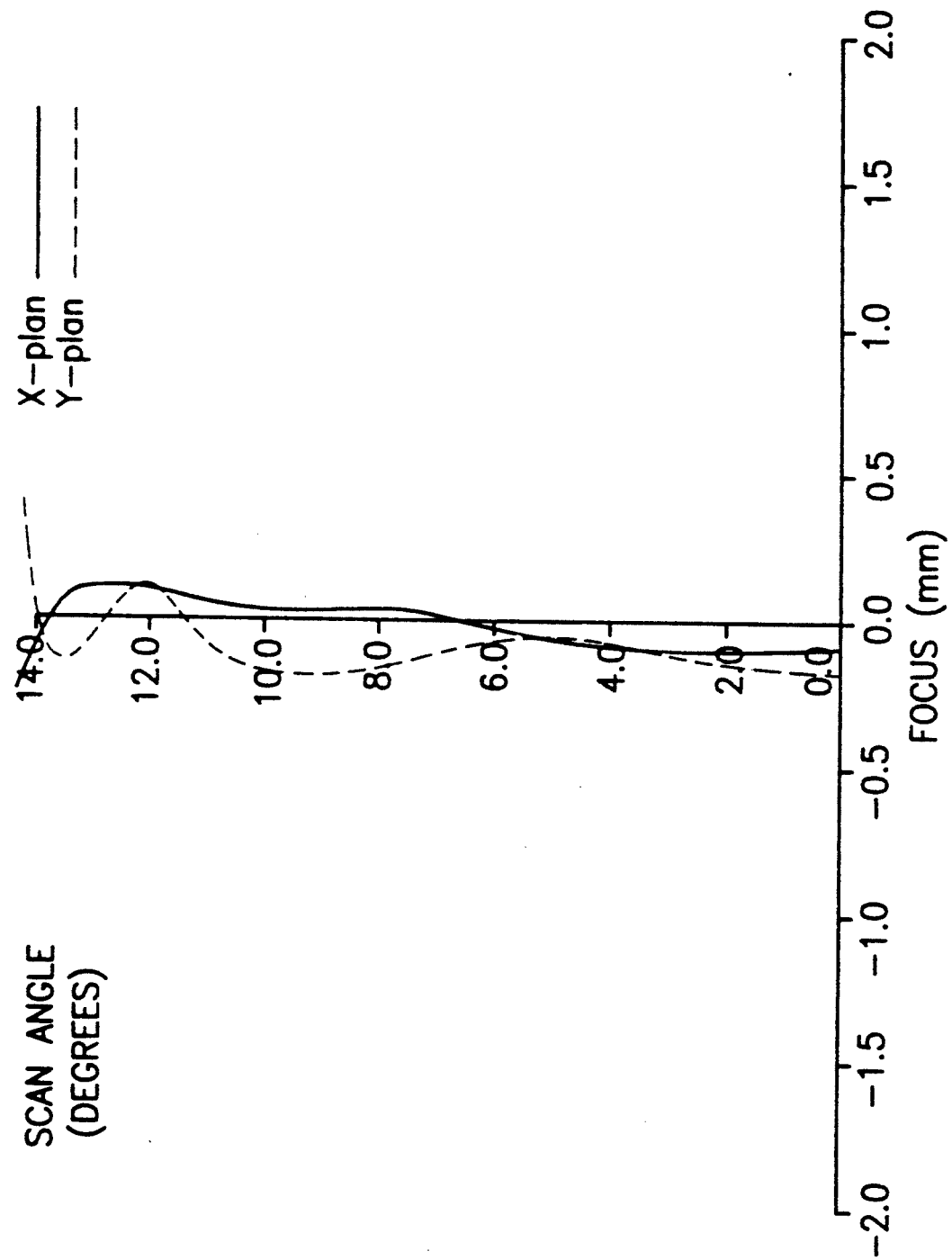
FIG. 16 is a curve diagram showing the field curvature of the seventh embodiment of the present invention.

The field curvature diagram and the scanning linearity diagram of the first embodiment are shown in FIG. 3 and FIG. 4 respectively.

Referring to FIG. 3, according to the edges of A4 paper, when the scanning angle is equal to 13.7°, the absolute linearity error is 0 mm. The maximum value of the relative linearity error is calculated as the following:

$$L_{max} = (0.2 \text{ mm}/70 \text{ mm}) * 100\% = 0.286\%.$$

As described above, according to the one-piece fΘ-DEC scanning lens of the present invention, because there is only one piece of lens, the structure can be significantly simplified, and can greatly lower costs when it is manufactured with ejection molding process. Additionally, due to the simplicity of the mechanism of the one-piece fΘ-DEC scanning lens and because it is near the polygon mirror scanner side, it can be assembled easily so as to decrease assembly errors. Furthermore, the one-piece fΘ-DEC scanning lens of the present invention has better linearity and is more able to calibrate the field curvature than a conventional fe scanning lens group containing two spherical lenses or one spherical lens with one cylindrical lens.

Although the present invention has been disclosed hereinbefore by way of preferred embodiments, it should be understood that various changes or modifications are still possible by those skilled in the art without departing from the spirit and scope of the present invention. The protection scope of the present invention should be regarded as claims described hereinafter.

What is claimed is

1. A one-piece fΘ-DEC scanning lens which is adapted to be used to focus a light beam on an image surface, said light emitted by a light source and being reflected by a polygon mirror scanner to scan on a plane, wherein the scanning plane is defined as a plane scanned by said light beam while the secondary scanning plane is defined as a plane perpendicular to said scanning plane;

furthermore, said one-piece fΘ-DEC scanning lens having a first surface and a second surface, while said first surface is near the light beam reflecting point of said polygon mirror scanner, and said first surface and said second surface are in accordance with the following equation:

$$Z = (C_x X^2 + C_y Y^2)/\{1 + SQRT[1 - (1 + K_x) C_x^2 X^2 - (1 + K_y) C_y^2 Y^2]\} + \Sigma A_n [(1 - A_n') X^2 + (1 + A_n') Y^2]$$

wherein, the origins of coordinates are defined as the apexes of said first surface and said second surface respectively, and the coordinates have X, Y, and Z axes which are perpendicular to each other, while said scanning plane is defined as YZ plane, and said secondary scanning plane is defined as XZ plane, wherein the concave surface of said first surface and said second surface are facing the light beam reflecting point of said polygon mirror scanner;

X, Y, and Z are coordinates of the X, Y, Z axes respectively;

$C_x$ and $C_y$ are the curvatures of the curved surfaces wherein the curve apexes are in XZ plane and YZ plane respectively;

$K_x$ and $K_y$ are the conic coefficients in XZ plane and YZ plane respectively;

$A_n$ and $A_n'$ are the 2n order rotational symmetry coefficients and 2n order non-rotational symmetry coefficients respectively;

whereby following criteria are satisfied:
(1) $0.27 \leq f_x/f_y \leq 0.35$
(2) $|R_{1y}| > |R_{2y}|$
(3) $0.3 < R_{2x}/R_{2y} < 0.6$, $R_{1x}/R_{1y} \leq 0$ wherein, $f_x$ represents the focal length in XZ plane;

$f_y$ represents the focal length in YZ plane;

$R_{1y}$ represents the radius of curvature of said first surface in YZ plane where the center of curvature on the same side as the incidence light beam is defined as a negative value;

$R_{2y}$ represents the radius of curvature of said second surface in YZ plane where the center of curvature on the same side as the incidence light beam is defined as a negative value;

$R_{1x}$ represents the radius of curvature of said first surface in XZ plane;

$R_{2x}$ represents the radius of curvature of said second surface in XZ plane.

2. The one-piece fΘ-DEC scanning lens as claimed in claim 1, wherein said one-piece fΘ-DEC scanning lens is manufactured from acrylic resin.

3. The one-piece fΘ-DEC scanning lens as claimed in claim 1, wherein said one-piece fΘ-DEC scanning lens is manufactured from molding glass.

* * * * *